Figure 1:
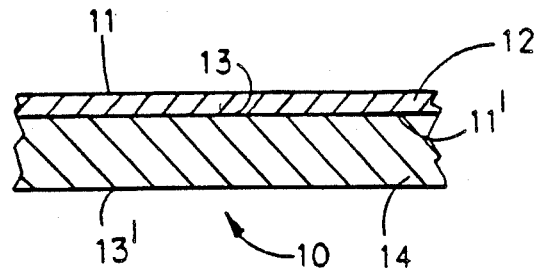

United States Patent [19]

Smith et al.

[11] Patent Number: 4,882,236

[45] Date of Patent: Nov. 21, 1989

[54] RIGID MAGNETIC RECORDING DISKS AND METHOD OF PRODUCING SAME

[75] Inventors: Charles W. Smith; Sheldon H. Butt, both of Godfrey, Ill.; Eugene Shapiro, Hamden, Conn.

[73] Assignee: Olin Corporation, Cheshire, Conn.

[21] Appl. No.: 154,557

[22] Filed: Feb. 10, 1988

[51] Int. Cl.$^4$ ............................................. B32B 15/20
[52] U.S. Cl. ............................. 428/652; 148/11.5 Q; 228/117; 428/674; 428/675
[58] Field of Search ................... 428/652, 674, 675; 148/11.5 Q; 228/117

[56] References Cited

U.S. PATENT DOCUMENTS

| | | | |
|---|---|---|---|
| 2,612,682 | 10/1952 | Burrack | 228/135 |
| 3,173,202 | 3/1965 | Farber | 228/173.2 |
| 3,183,588 | 5/1965 | Pruna | 148/6 |
| 3,258,839 | 7/1966 | Resnick | 228/116 |
| 3,381,366 | 5/1968 | Winter | 228/172 |
| 3,462,827 | 8/1969 | Winter | 228/172 |
| 3,886,052 | 5/1975 | Smith | 204/33 |
| 3,970,433 | 7/1976 | Warmka | 428/672 |
| 4,162,350 | 7/1979 | Yanagisawa et al. | 428/652 |
| 4,467,954 | 8/1984 | Brenneman | 228/117 |
| 4,498,121 | 2/1985 | Breedis et al. | 428/652 |
| 4,711,115 | 12/1987 | Sukonnik et al. | 428/579 |
| 4,722,872 | 2/1988 | Westerman | 428/654 |

FOREIGN PATENT DOCUMENTS

| | | | |
|---|---|---|---|
| 60604 | 5/1977 | Japan | 427/132 |
| 24023 | 2/1982 | Japan | 360/131 |

OTHER PUBLICATIONS

Metals Handbook, 9th Edition, vol. 6, "Welding, Brazing, and Soldering", pp. 680–686.
Proceedings of the IEEE, Nov. 1986, "Thin-Film Recording Media", pp. 1526–1538.

*Primary Examiner*—Robert McDowell
*Attorney, Agent, or Firm*—H. Samuel Kieser; Gregory S. Rosenblatt; Paul Weinstein

[57] ABSTRACT

The present invention discloses a rigid magnetic recording disk and a method of making the same. The substrate is formed by metallurgically bonding at least a first and second layer of clad materials. The hardness and mechanical strength of the first layer is substantially greater than the second layer. The first layer has a thickness which is from about 0.2% to about 20% the thickness of the second layer. The unbonded surface of the first layer is substantially flat and asperity free. The second layer is less dense than the first layer. A magnetic layer is deposited on the unbonded surface of the first layer.

6 Claims, 1 Drawing Sheet

RIGID MAGNETIC RECORDING DISKS AND METHOD OF PRODUCING SAME

The present invention relates in general to a rigid magnetic recording disk, and relates more particularly to such disks formed using an aluminum alloy substrate.

The substrate for a rigid magnetic recording disk usually consists of a thick layer of a nonmagnetic, and a thin layer of a nonmagnetic, harder material. The thick layer for the substrate is usually aluminum or an aluminum based alloy. The thin harder layer is usually a nickel or a nickel based alloy containing approximately 10% phosphorous. Phosphorous material is added to the nickel layer since the substrate for the rigid magnetic recording disk is required to be nonmagnetic.

The two layers of the substrate are usually bonded by either electroplating or by electroless plating means. The problem associated with using either of these means is the non-bonded, exposed surface of the nickel layer usually requires extensive polishing before it is suitable for depositing a magnetic layer. A major disadvantage of bonding by plating the two layers to form the substrate is the surface condition on the substrate can not be controlled. The resulting surface formed on the nickel layer usually requires extensive polishing and modifying before the surface is suitable for depositing the magnetic layer.

The consequence of applying the magnetic layer to an unsuitable surface would be that the rigid magnetic recording disk would function improperly. Furthermore, if the surface on which the magnetic layer is to be added is not substantially flat and asperity free, the magnetic layer formed thereon would adapt the same irregularities as the surface.

Traditionally, nickel was chosen as the material for the thin layr of the substrate. This provided the substrate with a harder material that was capable of withstanding the intermittent contacts the rigid magnetic recording disk has with the recording heads during normal operation.

The problems with the substrate surface when bonding the thick aluminum layer to the thin nickel layer by electroplating or electroless plating can be overcome by the present invention. The problems resulting from bonding the two layers by plating can be eliminated by metallurgically bonding the thick and thin layers of the substrate. The metallurgical bonding techniques used could be either cold rolling, hot rolling, diffusion bonding, roll-bonding or any other prior art technique. These techniques are described in U.S. Pat. No. 2,612,682 to Burrack, U.S. Pat. No. 3,183,588 to Pruna and in U.S. Pat. Nos. 3,381,366 and 3,462,827 both to Winter. More teaching of metallurgically bonding two dissimilar materials can be further found in U.S. Pat. No. 4,467,954 to Brenneman and in U.S. Pat. Nos. 3,258,839 to Resnick and 3,173,202 to Farber.

The main advantage of metallurgically bonding the two substrate layers is the surface obtained for depositing the magnetic layer requires very little modification. The desirable deposition surface on the substrate can be obtained by carefully manipulating the parameters which control the surface condition of the thin layer during the metallurgical bonding process. Thus, a flat, asperity free and uniform surface can be obtained by varying specific parameters during the bonding process.

The process of metallurgically bonding the thin and thick layers of the substrate would overcome many of the above-noted problems. The rigid magnetic recording disk in the instant invention and the process for forming the same is described hereinafter.

The present invention is directed to a rigid magnetic recording disk and a process for making the same. Thus, the process described by the present invention should eliminate polishing of the thicker aluminum alloy layer and minimize the surface polishing requirements of the thin harder layer of the substrate which has a magnetic layer subsequently deposited thereon.

The substrate formed by the instant invention will be comprised of a clad material. A thin layer of a harder, nonmagnetic metal is metallurgically bonded to the thick layer of the substrate. The thin layer of the substrate has a surface for depositing the magnetic layer which is substantially flat, asperity free and suitable for depositing the magnetic layer. When the substrate is formed by the present invention, the surface receiving the magnetic layer would need minimum polishing.

The process of the instant invention utilizes metallurgical bonding techniques as described in the above patents and further described in the *Metals Handbook*, 9th Edition, Volume 6, entitled "Welding, Brazing and Soldering", on Pages 680–686. In performing the instant process, particular care will be taken to control the surface properties of the thin layer when it bonded to the thicker layer of the substrate.

In accordance with the instant invention, a rigid magnetic recording disk and a process for making the disk is provided wherein the substrate is comprised of a clad material having at least first and second layers.

Each of the layers have first and second opposing surfaces. The first surface of the first layer is substantially asperity free as compared to an electroless or electroplated surface. The second surface of the first layer is bonded to at least one of the surfaces of the second layer without any substantial intermetallic formation. The thickness of the first layer is from about 0.2% to about 20% of the thickness of the second layer.

The hardness and the mechanical strength of the first layer are substantially greater than the hardness and the mechanical strength of the second layer. The second layer is substantially less dense than the first layer. A magnetic layer is deposited on the first surface of the first layer to form the rigid magnetic recording disk. The bonding of the magnetic layer to the first layer can be done by any of the prior art techniques generally known. Such techniques include sputtering, electroless plating or electroplating of magnetic media onto the substrate.

Accordingly, it is an object of this invention to provide a rigid magnetic recording disk substrate and a process for forming the same which has a flat, asperity free and uniform surface for receiving a magnetic layer thereon with minimum polishing.

It is a further object of this invention to provide a substrate which has minimum intermetallic compound formation between the two layers of the substrate.

It is a further object of this invention to provide an alternative process for forming a rigid magnetic recording disk by using a metallurgical bonding technique to form a substrate having a surface which requires minimum modifications before depositing the magnetic layer.

These and other objects of this invention will become more apparent from the following description and drawings wherein similar elements have been given corresponding or primed reference numbers.

Figure 2:
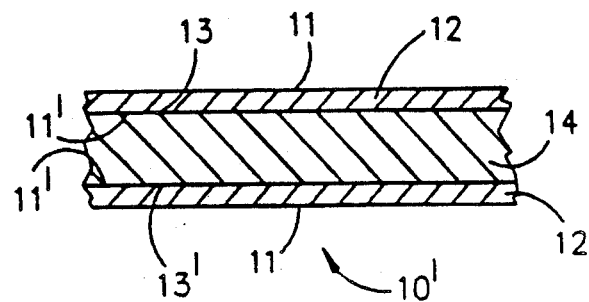
Figure 3:
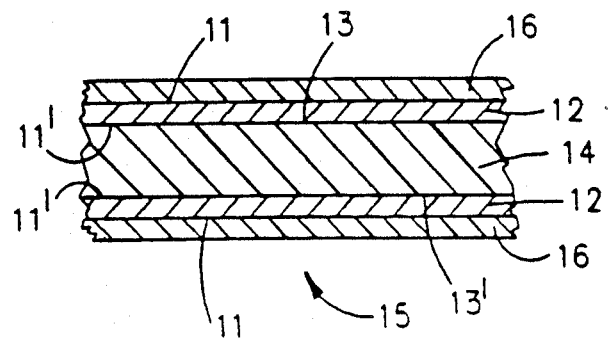

FIG. 1 discloses a cross section of a substrate in accordance with the present invention;

FIG. 2 dicloses a cross section of another embodiment of a substrate in accordance with the present invention; and FIG. 3 discloses a cross section of a rigid magnetic recording disk in accordance with the present invention.

Referring to the figures, the instant invention is directed to a substrate 10 and 10', a rigid magnetic recording disk 15 and a process for making the rigid magnetic recording disk 15. The substrate 10 and 10' for the rigid magnetic recording disk 15 comprises a clad material which has at least first and second layers 12 and 14. Each of the layers 12 and 14 have first and second opposing surfaces 11 and 11' and 13 and 13', respectively.

The first surface 11 of the first layer 12 is substantially asperity free. The second surface 11' of the first layer 12 is bonded to at least one of the surfaces 13 or 13' of the second layer 14 without any substantial intermetallic formation.

The first layer 12 has a thickness which is from about 0.2% to about 20% of the thickness of the second layer 14. The hardness and the mechanical strength of the first layer 12 is substantially greater than the hardness and the mechanical strength of the second layer 14. The second layer 14 is substantially less dense than the first layer 12.

The substrate 10 shown in FIG. 1 is a bi-clad and the substrate 10' described in FIG. 2 is a tri-clad. The substrate 10 shown in FIG. 1 should be used for a rigid magnetic recording disk having only one magnetic layer 16. The tri-clad substrate 10' in FIG. 2 is used for a rigid magnetic recording disk having a magnetic layer 16 on either side. The tri-clad substrate 10' shown in FIG. 2 is more representative of the substrate presently used for many rigid magnetic recording disks.

The substrates 10 and 10' shown in FIGS. 1 and 2 provide the support for a magnetic layer 16 to be deposited thereon as illustrated in FIG. 3. The substrate 10 and 10' is required to be nonmagnetic, light in weight and suitable for depositing a magnetic layer 16 thereon.

The magnetic layer 16 can consist of thin magnetic film coatings or be particulate coatings of magnetic particles. The choice of the magnetic layer 16 would be determined by the specific requirements of the rigid magnetic recording disk 15. Thin magnetic film coatings are particularly useful for high bit recording patterns and provide greater available signal amplitude than disks with particulate magnetic coatings. Thin magnetic film coatings are usually produced by sputtering, evaporation or electroplating a magnetic coating on an aluminum substrate.

Referring to the figures, the substrates 10 or 10' are shown with the second surface 11' of the first layer 12 bonded to the first surface 13 of the second layer 14. The first surface 11 of the first layer 12 is flat, substantially asperity free and uniform after minimum polishing.

The second layer 14 for the substrate 10 and 10' is usually comprised of an aluminum or an aluminum based alloy. Aluminum is selected because of it desirable physical properties, i.e. its low density, and its nonmagnetic features.

The first layer 12 for the substrate 10 or 10' is usually a harder, nonmagnetic material. The first layer 12 is a harder material to protect the second layer 14 which is comprised of an aluminum based alloy which is a softer material. The aluminum based alloy chosen for the second layer 14 could not withstand the intermittent contacts the recording head and disk encounter during normal operation and requires a harder layer for protection.

The material usually selected for the first layer 12 is either nickel or a nickel based alloy. The prior art nickel based material used for the first layer 12 requires an addition of a minimum of 10% phosphorous since the substrate 10 or 10' is required to be nonmagnetic. The aluminum substrates previously used required polishing before a harder layer material could be bonded to their surfaces.

In the normal structure of the substrate 10 or 10' the aluminum layer 14 is bonded to the nickel layer 12 by either electroplating or by electroless plating. The first surface 11 for the first layer 12 when formed by either of these techniques is usually full of asperities and is usually nonuniform. Traditionally, after the plating step the nonbonded surface of the nickel layer undergoes several polishing and grinding steps to rid it of asperities and nonuniformities and to provide a surface suitable for depositing a magnetic layer 16. The polishing and grinding steps are both time consuming and costly.

The present invention provides an alternative means for bonding the first layer 12 to the second layer 14 by eliminating either the electroplating or the electroless plating step or polishing the aluminum substrate before bonding the harder layer to its surface. The present invention reduces significantly the polishing and grinding required to the surface 11 formed on the substrate 10 or 10' for depositing the magnetic layer 16. In the present invention, the first layer 12 is bonded to the second layer 14 through the use of a metallurgical bonding technique. The metallurgical bonding technique used can be any of the techniques known in the prior art for bonding dissimilar metallic materials, i.e. these techniques include hot rolling, cold rolling, diffusion bonding or roll-bonding.

The primary advantage for using a metallurgical bonding technique to bond the first layer 12 to the second layer 14 is the surface 11 formed on the first layer 11 can be controlled to close tolerances with present manufacturing techniques. It is the ultimate desire to have the first surface 11 of the first layer 12 be flat, asperity free and have uniform microtopography. These parameters can be closely monitored during the metallurgical bonding process to provide the desirable surface condition on the first layer 12.

The process for forming a rigid magnetic recording disk 15 comprises providing a substrate 10 or 10'. The step of providing a substrate 10 or 10' comprises providing a first and second layer 12 and 14 which has first and second surfaces 11 and 11' and 13 and 13', respectively. The first surface 11 of the first layer 12 is substantially asperity free.

The thickness of the first layer 12 is from about 0.2% to about 20% of the thickness of the second layer 14. The hardness and the mechanical strength for the first layer 12 is greater than the hardness and mechanical strength of the second layer 14.

The second surface 11' of the first layer 12 is metallurgically bonded to at least one of the surfaces 13 and 13' of the second layer 14 without any substantial intermetallic formation.

A magnetic layer 16 is formed on the first surface 11 of the first layer 12 after the first surface 11 undergoes a minimum amount of polishing.

The metallurgical bonding technique described in this process includes roll-bonding, diffusion bonding, cold working and hot working of two dissimilar metals. The metallurgical bonding technique does include bonding two dissimilar metals together by electroplating or electroless plating or using chemicals to facilitate the formation of the bond.

The rigid magnetic recording disk 15 described in the present invention interfaces with recording heads to read and write data in its normal operation. Although the recording head is usually in flight above the disk surface, it comes in contact with the disk during the starting and stopping of a file, as well as momentary contacts during operation. The rigid magnetic recording disk 15 should be able to withstand a certain level of such interaction without disturbing the hydrodynamic stability of the head, which can cause the head to crash into the disk 15. The material for the first layer 12 is chosen based on the head to disk impact resistance requirements.

The hardness for the first layer 12 is usually chosen to be hard enough to withstand intermittent head to disk contacts during normal operation of the disk 15. The desirable thickness for the first layer 12 is determined based on the hardness requirements for the disk 15. The thickness for the first layer 12 is also determined by the mechanical strength desired for the first layer 12. The mechanical strength of the first layer 12 should be greater than the mechanical strength of the second layer 14. The greater hardness and mechanical strength of the first layer 12 helps the rigid magnetic recording disk 15 withstand the impact of the recording head contacting the disk 15 during operation.

The hardness and mechanical strength requirements for the surface of the first layer 12 for a substrate for a rigid magnetic recording disk are illustrated in an article in Proceedings of the IEEE, November, 1986, edition on Pages 1526–1538 entitled "Thin-Film Recording Media". The values given in the article for the knoop hardness in $kg/mm^2$ for a layer of nickel based alloy on an aluminum substrate were values ranged from 370 to 654 depending upon the loads applied at the surface.

The thickness of the first layer 12 is also controlled by the weight consideration for the rigid magnetic recording disk 15. It is normally preferred to minimize the substrate 10 or 10' weight by selecting materials which have low densities. The first layer 12 is provided with the smallest thickness possible to obtain the desirable hardness and mechanical strength. Therefore, the desirable thickness for the first layer 12 for the substrate 10 or 10' in the present invention should be from about 0.2% to about 20% to that of the second layer 14.

In the preferred embodiment of the present invention, the material for the first layer 12 should be a copper based alloy containing nickel. The copper based alloy should preferably contain from about 15 to about 30% nickel. The nickel content provided in the copper-nickel alloy inhibits intermetallic compound formation between the cupronickel alloy layer and the aluminum layer. U.S. Pat. No. 4,498,121 to Breedis et al. teaches the minimum nickel content required to minimize intermetallic compound formation.

Thus, the preferred material for the substrate 10 or 10' for this invention should be a copper based alloy containing from about 15% to about 30% of nickel for the first layer 12. Cupronickel alloys are preferred for the first layer 12 since they are believed to have superior physical properties than other available materials. Cupronickel alloys are also believe to provide better compatibility and bond strength for many of the magnetic layers presently used for the rigid magnetic recording disk 15. Cupronickel is also a single phase material and is readily polishable and does not generate excessive precipitates.

The preferred material for the second layer 14 is an aluminum based alloy containing magnesium.

The first layer 12 should be metallurgically bonded to the second layer 14. The bond formed between the first and second layers 12 and 14 (i.e. between the cupronickel alloy and the aluminum based alloy) can be formed by reference to any of the prior art methods as described in U.S. Pat. Nos. 2,612,682 to Burrack, 3,183,588 to Pruna, 3,381,366 to Winter, 3,462,827 to Winter, and 4,467,954 to Brenneman or any of the patents mentioned previously. These patents are all incorporated by reference as teaching bonding dissimilar materials and particularly for teaching bonding cupronickel to an aluminum alloy.

The cupronickel alloy for the first layer 12 when bonded to the aluminum material of the second layer 14 satisfies the hardness and the mechanical strength requirements for the substrate 10 or 10' of the rigid magnetic recording disk 15.

When the first layer 12 is deposited on the aluminum substrate 10 and 10', the first surface 11 should be substantially flat, asperity free and be uniform. The substrate 10 and 10' must be free of any asperities. If the first surface 11 of the first layer 12 has any surface irregularities, the defects might be deleterious to the performance of the disk 15.

For example, when the magnetic layer 16 and 16' is a thin magnetic film coating, irregularities in the surface 11 would result in unacceptable depositions of the magnetic layer 16 or 16' on the substrate 10 or 10'. Since thin magnetic coatings usually replicate the topography on which they are deposited, asperities on the first surface 11 of the first layer 12 would effect the uniformity of the magnetic layer 16 when it is deposited on the first layer 12.

The second surface 11' of the cupronickel layer 12 is metallurgically bonded to the first and second surfaces 13 and 13' of the aluminum-magnesium layer 14. The first surface 11 of the first layer 12 is flat, asperity free, and has uniform microtopography. An advantage of the present invention is the magnetic layer 16 can be deposited on the first surface 11 of the first layer 12 with the first surface 11 having to undergo minimum amounts of polishing. Some minimum polishing to the first surface 11 of the first layer 12 is required to provide for a more suitable surface for depositing the magnetic layer 16.

The magnetic layer 16 is deposited on the first surface 11 of the first layer 12 by any of a number of means. The processes for depositing the magnetic layer 16 on the substrate 10 or 10' generally used are electroplating, electroless plating, evaporation, or sputtering. These prior art means of depositing the magnetic layer 16 on the first surface 11 are incorporated herein by reference.

It is preferred, but not required in accordance with the present invention to mechanically roughen the bonding surface of the first and second layers 12 and 14 to insure good surface contact. For example, the surfaces may be wire brushed before bonding.

A further advantage of the present invention is that several manufacturing steps can be eliminated when forming a rigid magnetic recording disk such as polishing and grinding the nickel and aluminum surfaces. The normal process of forming a substrate 10 or 10' consists of bonding layers of aluminum and nickel by either electroplating or by electroless plating. The surface for bonding the magnetic layer must undergo several rigorous polishing and grinding steps before its acceptable for depositing the magnetic layer. The present invention eliminates many of the traditionally required steps for forming a substrate by providing a surface suitable for depositing the magnetic layer 16 with minimum polishing required.

A further advantage of the present invention is that more materials are available for use as the thin harder layer 12. The adhesion of the magnetic layer 16 varies with different materials, i.e. it has been found that copper based alloys are more compatible and provide better adhesion for many magnetic materials than almost any other material.

The materials usually selected for the thin harder layer 12 when the substrate 10 or 10' is formed by either electroplating or electroless plating is limited to materials that are polishable to a flat and asperity free surface. The material selected for the first layer 12 when plating is required must also be compatible with the magnetic layer and be bondable to the aluminum layer 14 with minimum intermetallic formation.

The choice of materials for the first layer could have an adverse effect on the adhesion of the magnetic layer 16 to the first layer 12. Nickel has been the overwhelming choice for the first layer when the layers are bonded by plating but it has adhesion problems when bonded to some magnetic particles. For example, cobalt is frequently used as one of the components for the thin film magnetic coating. It is has been found that cobalt is not compatible to all metals. U.S. Pat. No. 3,970,433 to Warmka describes the use of a gold layer to improve the adhesion of the underlayer to the magnetic layer. Thus, a further advantage of the present invention is a variety of materials can be selected for the first layer 12 which will be compatible with the magnetic layer 16 and satisfy the hardness and strength requirements for the substrate 10 or 10'.

Thus, with the polishing requirements for the thin layer 12 of the present invention being drastically reduced, there are many more materials available that would satisfy the hardness, the mechanical strength and the compatibility to many magnetic layer requirements. Although, it is preferred for the first layer 12 to be a copper based material containing nickel other materials could also be used.

The process of the present invention has primarily been described in the formation of a rigid magnetic recording disk 15 having two first layers 12 formed on the first and second surface 13 and 13' of the second layer 14. However, as shown in FIG. 1, it is also within the terms and scope of the present invention to form the rigid magnetic recording disk with a single first layer 12 on the first surface 13 of the second layer 14 substrate.

The patents and publications set forth in this application are intended to be incorporated by reference herein.

It is apparent that there has been provided in accordance with this invention a rigid magnetic recording disk and a process for forming a rigid magnetic recording disk which satisfies the objects, means, and advantages set forth hereinabove. While the invention has been described in combination with the embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims.

We claim:
1. A substrate for a rigid magnetic recording disk, said substrate comprising:
 a clad material having at least first and second layers, each of said layers having first and second opposing surfaces;
 said first layer comprising a copper-based alloy containing nickel;
 said second layer comprising a material selected from the group consisting of aluminum and aluminum alloys;
 said first surface of said first layer being substantially asperity free;
 said second surface of said first layer being metallurgically bonded to at least one of said surfaces of said second layer without any substantial intermetallic formation;
 the thickness of said first layer being from about 0.2% to about 20% of the thickness of said second layer;
 the hardness and the mechanical strength of said first layer being substantially greater than said second layer; and
 said second layer being substantially less dense than said first layer.

2. A substrate in accordance with claim 1 wherein said copper-based alloy comprises from about 15% to about 30% nickel.

3. A rigid magnetic recording disk comprising:
 a magnetic layer;
 a substrate supporting said magnetic layer;
 said substrate being formed by a clad material having at least first and second layers, each of said layers having first and second opposing surfaces;
 said first layer comprising a copper-based alloy containing nickel;
 said second layer comprising a material selected from the group consisting of aluminum and aluminum alloys;
 said first surface of said first layer being substantially asperity free and having said magnetic layer thereon;
 said second surface of said first layer being metallurgically bonded to at least one of said surfaces of said second layer without any substantial intermetallic formation;
 the thickness of said first layer being from about 0.2% to about 20% of the thickness of said second layer;
 the hardness and the mechanical strength of said first layer being substantially greater than said second layer; and
 said second layer being substantially less dense than said first layer.

4. A disk in accordance with claim 3 wherein said copper-based alloy comprises from about 15% to about 30% nickel.

5. A process for forming a rigid magnetic recording disk comprising:
 providing a substrate;
 said step of providing a substrate comprising providing a first layer having first and second surfaces, said first surface of said first layer being substantially asperity free;
 providing a second layer having first and second surfaces, with the thickness of said first layer being from about 0.2% to about 20% greater than the thickness of said second layer, and with the hardness and the strength for said first layer being greater than that said second layer;

said first layer comprising a copper-based alloy containing nickel;

said second layer comprising a material selected from the group consisting of aluminum and aluminum alloys;

metallurgically bonding said second surface of said first layer to at least one of said surfaces of said second layer without any substantial intermetallic formation; and forming a magnetic layer on said first surface of said first layer.

6. A process in accordace with claim 5 wherein said copper-based alloy comprises from about 15% to about 30% nickel.

* * * * *